(No Model.)  2 Sheets—Sheet 1.
T. VILLAMOR.
MACHINE FOR CLEANING VEGETABLE FIBER.
No. 399,802. Patented Mar. 19, 1889.
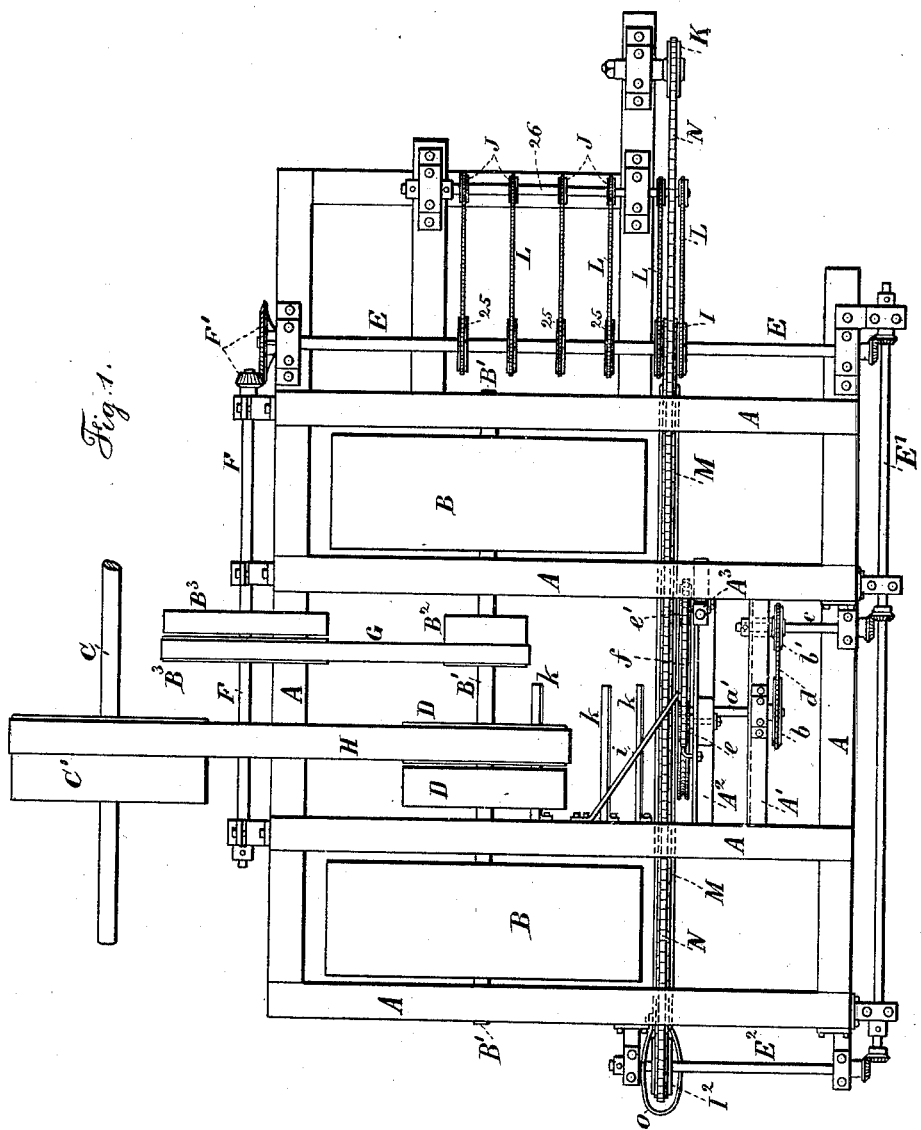
Witnesses:
J. Staib
Chas H. Smith
Inventor:
Timoteo Villamor,
per Lemuel W. Serrell atty (No Model.) 2 Sheets—Sheet 2.
T. VILLAMOR.
MACHINE FOR CLEANING VEGETABLE FIBER.
No. 399,802. Patented Mar. 19, 1889.
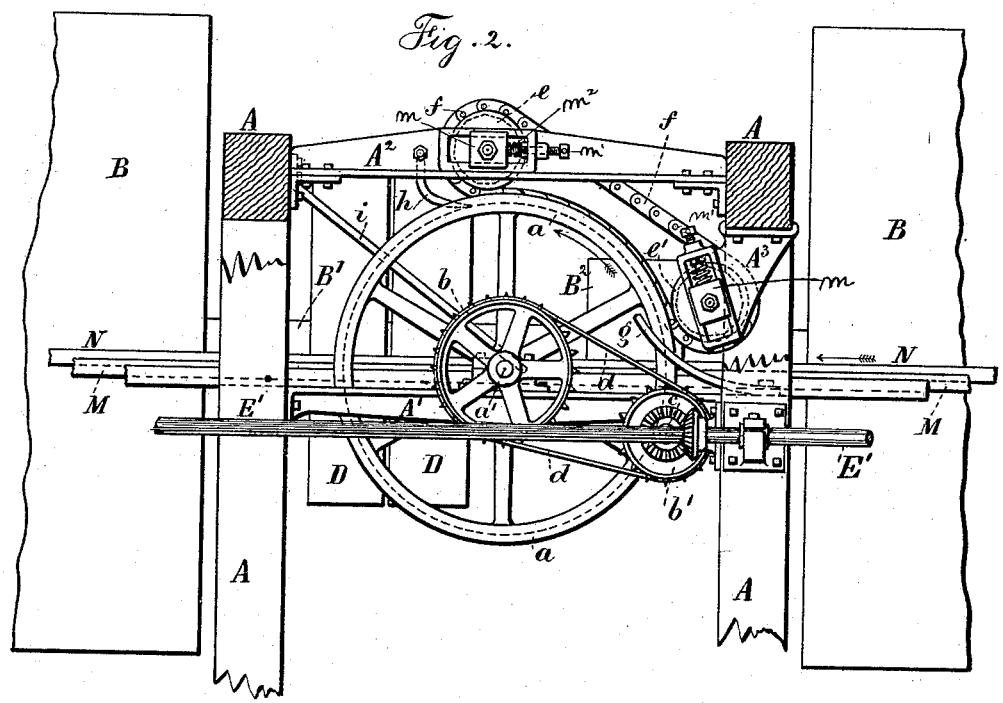
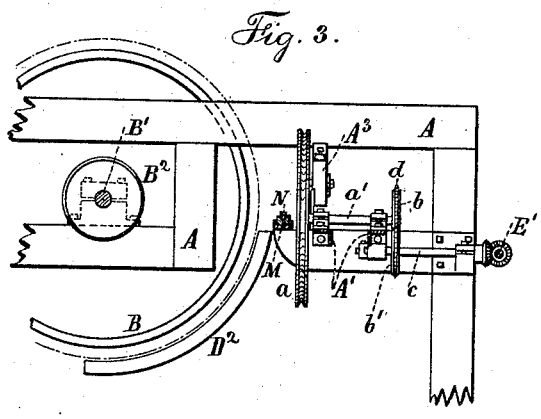
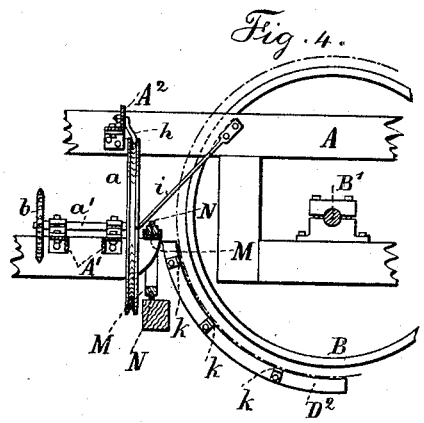
Witnesses:
J. Staib
Chas. H. Smith
Inventor:
Timoteo Villamor
per Lemuel W. Serrell Atty

UNITED STATES PATENT OFFICE.

TIMOTEO VILLAMOR, OF MERIDA, YUCATAN, MEXICO.

MACHINE FOR CLEANING VEGETABLE FIBER.

SPECIFICATION forming part of Letters Patent No. 399,802, dated March 19, 1889.

Application filed September 29, 1888. Serial No. 286,729. (No model.)

*To all whom it may concern:*

Be it known that I, TIMOTEO VILLAMOR, of Merida, Yucatan, Mexico, have invented an Improvement in Machines for Cleaning Vegetable Fiber, of which the following is a specification.

My present invention relates to an improvement upon the machine secured to me by Letters Patent of May 10, 1887, No. 362,683. In the machine described in the before-named patent the stalks or leaves from which the pulpy portions are removed to extract the fiber were placed upon endless traveling belts and conveyed by them between endless grasping-chains, which chains acted as conveyers, carrying the stalks or leaves into the machine, where they were acted upon by a revolving wheel having scrapers on its periphery, the stalk or leaf as scraped lying against a segmental board corresponding with the circumference of the scraping-wheel, the conveying-chain grasping the leaf or stalk, carrying the same along as scraped, and delivering it at the opposite end of the machine, where the leaf or stalk as partially scraped was taken by hand and again put through the machine to complete the scraping operation upon the other end of said stalks or leaves; and the object of my present invention is to provide a means which shall make it unnecessary to handle the stalks or leaves.

In my present invention I employ a double machine, or two such machines as are described and shown in my aforesaid Letters Patent, the same being coupled together and connected by a device which turns over each leaf or stalk as the same passes away from the first machine, and each stalk or leaf after being turned over passes through the second machine and the scraping operation is finished.

The features of my present invention relate, in the main, to the mechanism for turning over the stalk or leaf, such mechanism consisting of a grooved wheel and an endless traveling belt which fits into the groove of said wheel for about a quarter of its circumference, and I employ guide-bars for guiding the unscraped end of the stalk or leaf in between the wheel and belt, and guide bars or fingers for removing the unfinished end from the groove of said wheel and for turning the same over, and guide-bars connected to the segmental scraping-board of the second machine, which guide-bars receive the unscraped end as it falls over and direct the same onto the scraping-board beneath the scrapers of the scraping-wheel.

In the drawings, Figure 1 is a plan of the double machine. Fig. 2 is a side elevation, in enlarged size, of the mechanism for turning over the leaf or stalk, the frame being partially removed and the ends of the scraping-cylinder being shown; and Figs. 3 and 4 are end views, partially in section, in opposite directions of portions of the turning-over mechanism.

I have shown in Fig. 1 only so much of the mechanism shown in the drawings of my former patent herein named as is necessary for illustrating and connecting the same with the mechanism for turning over the leaf or stalk, and reference is hereby made to said former patent for a full description of the parts and the operation of said machine.

A represents the main frame of the machine. B represents the wheels, upon the surface of which are placed the scrapers. These wheels B are mounted upon a common shaft, B', which extends across the frame of the double machine. The main driving or power shaft C, upon which is the pulley C', operates the driving-belt H, which passes around said pulley and around one or other of the pulleys D, which pulleys D are upon the shaft B', one being fast and the other loose to provide for shifting the belt to stop or start the machine. Upon the shaft B' is a pulley, B², and upon the shaft F are fast and loose pulleys B³, and a belt, G, connects the pulleys B² B³ and communicates power from the shaft B' to the shaft F. The shaft F by means of the bevel-wheels F' revolves the cross-shaft E, and upon the shaft E are the wheels or pulleys 25, around which pass belts or endless chains L, said endless belts or chains also passing round the pulleys J on the shaft 26.

The endless chains or conveyers N M are made as described in my aforesaid patent, the chain N at one end passing around the pulley K and the chain M passing around the pulley I on the shaft E, the chain N fitting in the groove of the chain M, and said chains pass along through the double machine and around the pulley $I^2$. The shaft E by means of bevel-wheels operates the shaft E', and it in turn by bevel-wheels operates the shaft $E^2$, so that the shafts E and $E^2$ revolve at a like speed and the chains N M are caused to travel uniformly, the stalks or leaves to be fed into the machine being laid upon the belts or chains L parallel with the shaft E, the shorter end projecting outside of the chains N M in the direction of the shaft E', and this projecting end, according to the length of the stalk or leaf, will be from about a quarter to a half its total length, so that the first scraping operation will remove the pulp from the main portion of the leaf or stalk. The various shafts heretofore named are to be mounted in suitable bearings connected to the frame of the machine.

The devices for turning over the leaf or stalk consist of a grooved wheel, $a$, its shaft $a'$, mounted in suitable bearings upon the frame A', and upon one end of the shaft $a'$ is a chain-wheel, $b$, and connected by bevel-wheels with the shaft E' is a short shaft, $c$, upon which is a chain-wheel, $b'$, and around the chain-wheels $b$ $b'$ there is a chain or band, $d$. The cross-frame $A^2$ and a hanger, $A^3$, are slotted and provided with sliding bearing-blocks $m$, screw-bolts $m'$, and helical springs $m^2$, forming adjustable bearings for the grooved rollers $e$ $e'$. Around the rollers $e$ $e'$ passes the endless chain or conveyer $f$, which chain or conveyer is formed of links similar to those of the chain N, and said chain or conveyer $f$ rests in the groove of the wheel $a$ for about one-quarter of its circumference, as will be seen from Fig. 2, and the tension of said chain or conveyer $f$ is regulated and its slack taken up by the adjustable bearings aforesaid.

I provide a curved finger or arm, $g$, which is attached to the frame of the machine, and curves upwardly toward the meeting-point of the chain $f$ and grooved wheel $a$. I provide a curved finger, $h$, connected to the cross-frame $A^2$ and extending downwardly, its point entering the groove of the wheel $a$ back of a vertical line drawn through the center of the chain-roller $e$. I also provide a downwardly-inclined arm, $i$, the upper end of which is secured to the frame of the machine, its lower end passing over the top of the chains N M. Extending out from the side of the segmental scraping-board $D^2$ there are arms $k$, the ends of which arms extend slightly beyond the axial line of the shaft $a'$.

The operation of the double machine and turn-over mechanism is as follows: The stalks or leaves are laid horizontally upon the belts or chains L, and they are conveyed in between the chains N M, and by said chains are carried forward beneath the first scraping-wheel B, where about one-half to three-quarters of the length of the stalk or leaves are scraped, while the stalk or leaf is held securely between the chains N M in the manner described in my aforesaid patent. As the stalk or leaf, partially scraped, passes on through the machine, the unscraped end by the traveling movement of the chains N M in the direction of the arrow is raised upwardly by the curved arm or finger $g$ into the bite of the grooved wheel $a$ and chain $f$, these parts traveling at a slightly greater speed than that of the belts N M, which belts at this point are free and are not held together by the rollers V and their yielding supports and springs, which mechanism is that described in my aforesaid patent, which acts to hold the belts N M together while the leaf is being scraped. As the unscraped end of the stalk or leaf now in the grip of the wheel $a$ and chain $f$ is elevated by the revolution of the wheel and chain, the finished portion or fiber is drawn almost through between the chains N M, and as the unfinished portion of the leaf passes the highest point of the wheel $a$ and passes out of the bite of the wheel $a$ and chain $f$ the finished portion of the fiber between the chains N M has been drawn along beneath the inclined arm $i$. The unfinished portion is now raised by the curved finger $h$ out of the groove of the wheel $a$, and said unfinished end is drawn outwardly and upwardly over the inclined arm $i$ by the movement of the chains N M, and falls over toward the axis B' upon the arms $k$. This movement places the unfinished end of the stalk or leaf in position to be drawn through by the chains N M and scraped by the second of the scraping-wheels B. At the time that this unfinished end falls over in the manner just described a portion of the fiber is between the chains N M, and the fiber is brought over the top of the chain N by this movement, there being sufficient friction between the two chains to hold the fiber and to draw the unfinished end, which now rests on the arms $k$, toward the segmental scraping-board $D^2$, and as the unfinished end of the stalk or leaf passes onto this scraping-board to be operated on by the second scraping-wheel B the chains N M and fiber between the same and around the chain N are again grasped and held by the rollers V and their yielding supports and springs described and shown for that purpose in my aforesaid patent. The fiber now passes through between the segmental scraping-board $D^2$ and the second scraping-wheel B, and the pulp from its previously unscraped end is here removed, so that the leaf or stalk is completely reduced to fiber, which hank of fiber passes out beyond the segmental scraping-board and scraping-wheel and rides over the looped wire $o$. This looped wire $o$ is fastened at its upper and inner end below the chains that hold the hank and rises above the inner bearing for the shaft $E^2$ and descends below and at the other side of the chain-wheel $I^2$, so that the hank of fiber as it is drawn along by the chains is lifted by the looped wire sufficiently to prevent it dragging against such bearing, and then the hank falls, so as to hang from the chains below the wheel $I^2$, where such chains are sufficiently loose to allow the hank of fiber to be drawn out from between them by hand.

I claim as my invention—

1. The combination, in a machine for cleaning vegetable fiber, with the scrapers and traveling chains or conveyer, of the grooved wheel $a$ and devices for rotating said wheel, and an endless chain, $f$, moved around a portion of the circumference thereof, for grasping and elevating the stalk or leaf, and with curved or inclined arms for engaging and turning over the leaf, substantially as set forth.

2. The combination, in a machine for cleaning vegetable fiber, with the scraping-wheels and endless chains or conveyers, of the grooved wheel $a$ and devices for rotating said wheel, the endless chain or conveyer $f$, engaging the grooved wheel $a$ for a portion of its circumference, said wheel and conveyer moving in line with and at one side of the main chains or conveyer, a curved arm or finger, $g$, for guiding the stalk or leaf between the grooved wheel and chain $f$, a downwardly-inclined arm, $i$, the segmental scraping-board $D^2$, and arms connected to one side of the same and adapted to receive the unfinished end of the stalk or leaf as it falls, substantially as and for the purposes set forth.

3. The combination, in a machine for cleaning vegetable fiber, with the scraping-wheels and endless chains or conveyers, of the grooved wheel $a$ and devices for rotating said wheel, the endless chain or conveyer $f$, engaging the grooved wheel $a$ for a portion of its circumference, said wheel and conveyer moving in line with and at one side of the main chains or conveyer, a curved arm or finger, $g$, for guiding the stalk or leaf between the grooved wheel and chain $f$, a curved finger, $h$, for removing the same from the grooved wheel, a downwardly-inclined arm, $i$, the segmental scraping-board $D^2$, and the arms $k$, extending out from one side of the same and adapted to receive the unfinished end of the stalk or leaf as it falls, substantially as and for the purposes set forth.

4. The combination, with the main frame A, the cross-frame $A^2$, and bracket $A^3$, of the endless chain or conveyer $f$, rollers $e\ e'$ for the same, sliding blocks, screw-bolts, and springs forming adjustable bearings for the shafts of said rollers, the grooved wheel $a$, supporting-frames and bearings for the shaft of said wheel, and mechanism, substantially as specified, for operating said wheel, substantially as set forth.

5. In a machine for cleaning vegetable fiber, the combination, with the scraping-wheels B, of the shaft $B'$ for both of said scrapers, the pulleys D and band H, for operating said scrapers, the pulleys $B^2\ B^3$, the belt G, the shafts F E $E'\ E^2$, and the bevel-wheels connecting the ends of said shafts, the shafts $c$ and $a'$, the toothed wheels $b\ b'$, and chain $d$, the grooved wheel $a$, and the endless chains or conveyers N, M, and $f$, and their respective pulleys, and the arms $g$, $h$, $i$, and $k$, the parts being connected and operated in substantially the manner and for the purposes herein shown and described.

6. In a machine for cleaning vegetable fibers, the combination, with the conveying-belts L and the two scraping-wheels B and their segmental scraping-boards, of the endless chains or conveyers N M, passing entirely through the length of the double machine, the pulleys I, $I^2$, and K, around which said chains pass, and mechanism, substantially as shown and described, for revolving said pulleys at a uniform speed, substantially as set forth.

7. In a machine for cleaning vegetable fibers, the combination, with the scraping-wheels and endless chains or conveyers and their pulleys, of the bent or loop wire $o$, upon which the cleaned fiber is raised and turned over after being scraped, substantially as set forth.

Signed by me this 27th day of August, 1888.

TIMOTEO VILLAMOR.

Witnesses:
GEO. T. PINCKNEY,
WILLIAM G. MOTT.